Feb. 13, 1940.   E. P. FAGER   2,190,060
WATER TREATING APPARATUS
Filed Aug. 30, 1937
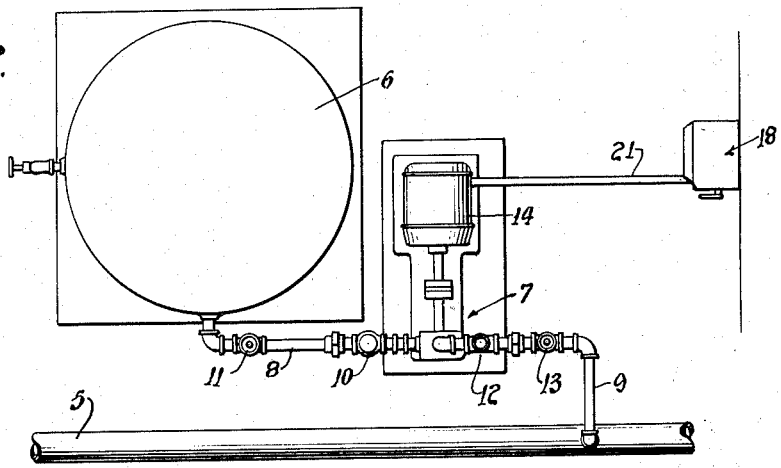
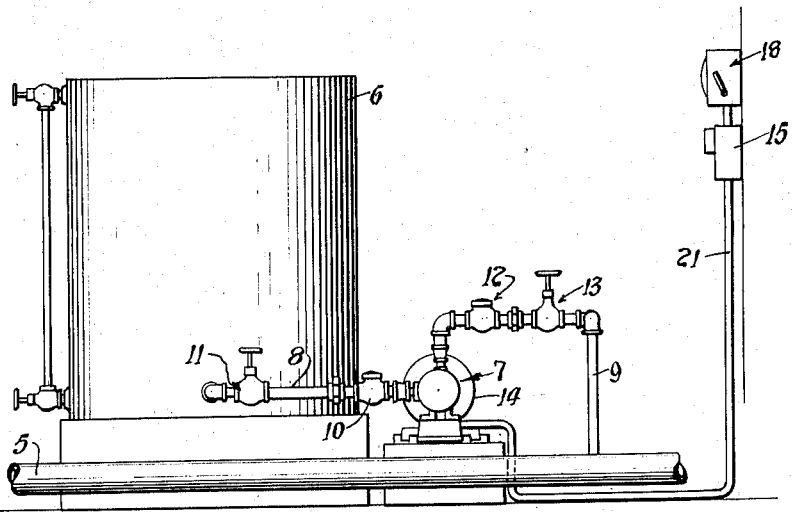
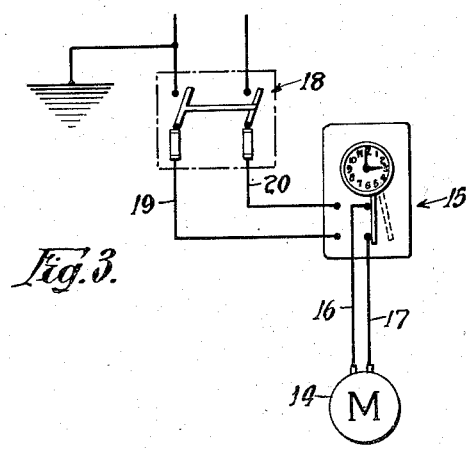
Inventor:
Eugene P. Fager,
By Arthur W. Nelson
Attorney.

Patented Feb. 13, 1940

2,190,060

UNITED STATES PATENT OFFICE 2,190,060

WATER TREATING APPARATUS

Eugene P. Fager, Winnetka, Ill., assignor to Dearborn Chemical Company, Chicago, Ill., a corporation of Illinois Application August 30, 1937, Serial No. 161,565

5 Claims. (Cl. 210—40)

This invention relates to improvements in water treating apparatus and it consists of the matters hereinafter described and more particularly pointed out in the appended claims.

One of the objects of the present invention is to provide apparatus capable of automatically feeding reagent to the water to be treated at predetermined intervals in an amount required by the demand for treated water.

Another object of the invention is to provide apparatus of this kind including a pump for transferring reagent from a supply thereof into the water to be treated and which pump may be automatically started at desired intervals for predetermined lengths of time and then stopped, the starting and stopping being regulatable in accordance with the demands for treated water.

A further object of the invention is to provide apparatus of this kind which includes a pump for delivering reagent into the water to be treated and which pump is driven by a motor controlled by a time switch whereby the motor is caused to run for a desired number of minutes at the desired intervals.

The above mentioned objects of the invention, as well as others, together with the advantages thereof, will more fully appear as the specification proceeds.

In the drawing:

Fig. 1 is a view in side elevation of one form of water treating apparatus capable of carrying out the invention.

Fig. 2 is a top plan view of the apparatus appearing in Fig. 1.

Fig. 3 is a diagrammatic view of a circuit for the motor employed in the apparatus.

Referring now in detail to that embodiment of the invention illustrated in the drawing, 5 indicates a means for containing the water to be treated and which means is herein shown as a pipe, which may lead to the suction side of a steam boiler feed pump (not shown). 6 indicates a tank for holding a supply of liquid reagent with which the water in said means 5 is to be treated. 7 indicates a pump of any suitable kind having its inlet side connected to the bottom portion of the tank by a pipe 8 and having its discharge side connected to the means 5 by a pipe 9. In the pipe 8 are check and shut-off valves 10 and 11 respectively and in the pipe 9 are check and shut-off valves 12 and 13 respectively. When the pump is in operation, it is apparent that reagent in liquid form is withdrawn from the tank and discharged into the means 5.

The pump is preferably directly driven by an electric motor 14, the circuit of which is controlled by a variable time switch 15 of a kind by which the circuit for the motor is closed and held closed for a desired number of minutes at predetermined intervals of time. Such switches are of known construction and have been designed for use in other industries. Such a switch may be so set that the motor circuit is closed and held closed during a period of from one to twelve minutes out of each half hour or hour.

As appears in Fig. 3, two current conductors 16 and 17 lead off from one side of the switch to the motor. 18 indicates a line switch through which conductors 19 and 20 extend to another side of the switch 15. As shown in Figs. 1 and 2, suitable conduit material 21 is provided for the conductors from the line switch to the time switch and from the latter to the motor.

Assume that the demand for treated water during the day is substantially uniform. By a setting of the time switch, it is possible to energize the motor for a period of say ten minutes every half hour so that the treated water is of uniform character throughout the day. Assume that at night the demand for treated water though less, is still uniform. The time switch may be set to energize the motor for a period say about five minutes every hour. Thus, after a setting of the time switch, the treatment is automatic and uniform and no attention is required from the operator except to maintain the desired amount of reagent in the tank.

The apparatus as described herein is of simple character so that it may be produced at low cost. It is automatic and positive in its action and may be readily set to meet any demand within reason for treated water, no matter to what use the said treated water may be put.

While in describing the invention I have referred in detail to the form, arrangement and construction of the various parts thereof, the same is to be considered only in the illustrative sense so that I do not wish to be limited thereto except as may be specifically set forth in the appended claims.

I claim as my invention:

1. Water treating apparatus comprising in combination with means for containing water to be treated, means for holding a supply of reagent, a pump operable to deliver reagent from said supply means into said water containing means, a motor for driving said pump, and means operating automatically at predetermined intervals for controlling said motor, said last mentioned means being capable of being set to vary the length of the operating periods and also the intervals between operating periods.

2. Water treating apparatus comprising in combination with means for containing water to be treated, means for holding a supply of reagent, a pump operable to deliver reagent from said supply means into said water containing means, a motor for driving said pump, and means providing a time switch operating automatically at predetermined intervals for controlling said motor, said time switch being capable of being set to vary the length of the operating periods and also the intervals between operating periods.

3. Water treating apparatus comprising in combination with means for containing water to be treated, means for holding a supply of reagent, means providing a conduit connecting said water containing means and said reagent supply means, means providing a pump in said conduit, driving means for said pump, and means operating automatically at predetermined intervals for controlling the operation of said driving means, said last mentioned means being capable of being set to vary the length of the operating periods and also the intervals between operating periods.

4. Water treating apparatus comprising in combination with means for containing water to be treated, means for holding a supply of reagent, means providing a conduit for connecting said water containing means and said reagent supply means, means providing a pump in said conduit, an electric motor for driving the pump, and means operating automatically at predetermined intervals for controlling said motor, said last mentioned means being capable of being set to vary the time length of the operating periods and also the intervals between operating periods.

5. Water treating apparatus comprising in combination with means for containing water to be treated, means for holding a supply of reagent, means providing a conduit for connecting said water containing means and said reagent supply means, means providing a pump in said conduit, an electric motor for driving the pump, a circuit for said motor, and a time switch in said circuit and operating periodically to make and break said circuit, said time switch being capable of being set to vary the time said circuit is held closed and the time said circuit is held open.

EUGENE P. FAGER.